United States Patent [19]

Chang et al.

[11] Patent Number: 4,496,622

[45] Date of Patent: Jan. 29, 1985

[54] ARTICLE COATED WITH A SULFUR STABILIZED OXIDIZED POLYOLEFIN AND ASPHALT COMPOSITION

[75] Inventors: Irving B. Chang; Robert E. Beckwith, Jr., both of Morristown, N.J.

[73] Assignee: Allied Corporation, Morris Township, Morris County, N.J.

[21] Appl. No.: 623,303

[22] Filed: Jun. 22, 1984

Related U.S. Application Data

[62] Division of Ser. No. 528,826, Sep. 2, 1983.

[51] Int. Cl.³ .............................................. D04H 1/08
[52] U.S. Cl. .................................... 428/280; 428/441; 428/490; 428/491; 428/513
[58] Field of Search ............... 428/280, 441, 490, 491

[56] References Cited

U.S. PATENT DOCUMENTS

| | | | |
|---|---|---|---|
| 4,282,127 | 8/1981 | Desgouilles | 428/441 |
| 4,328,147 | 5/1982 | Chang et al. | 428/280 |
| 4,382,989 | 5/1983 | Chang et al. | 428/280 |

*Primary Examiner*—Lewis T. Jacobs
*Attorney, Agent, or Firm*—Richard A. Negin; Jay P. Friedenson; Richard A. Anderson

[57] ABSTRACT

The present invention is a sulfur stabilized composition. The composition comprises an oxidized polyolefin, preferably oxidized polyethylene or oxidized polypropylene, with oxidized polyethylene being most preferred. The composition of the present invention can comprise oxidized polyolefin, asphalt, preferably oxidized, and optionally a filler.

6 Claims, No Drawings

ARTICLE COATED WITH A SULFUR STABILIZED OXIDIZED POLYOLEFIN AND ASPHALT COMPOSITION

This application is a division of application Ser. No. 528,826, filed 9/2/83.

DESCRIPTION

This invention is in the field of polyolefin and asphalt compositions; more particularly, the invention relates to sulfur stabilized oxidized polyolefin and asphalt compositions containing oxidized polyethylene are known as disclosed in U.S. Pat. Nos. 4,328,147 and 4,382,989. Such compositions are used to make roofing felts and asphalt coated paper used as vapor barriers in the construction of buildings and houses. The use of oxidized polyethylene has been found to improve the cold temperature flexibility of roofing felt. The addition of the oxidized polyethylene to the asphalt composition maintains a low viscosity and low flexibility of the asphalt at low temperatures.

Paper and felt coated with asphalt are stored on continuous rolls or in stacks of sheets. It has been found that at high temperatures and shear the asphalt and oxidized polyethylene compositions increase in viscosity. This results in the necessity to slow down the operation of coating asphalt onto sheets and other substrates.

SUMMARY OF THE INVENTION

The present invention is a sulfur stabilized composition. The composition comprises an oxidized polyolefin, preferably oxidized polyethylene or oxidized polypropylene, with oxidized polyethylene being most preferred. The preferred oxidized polyethylene has a Brookfield viscosity at a 149° C. of from about 100 to about 40,000 centipoises. There is from about 0.1 to about 10, preferably 0.1 to 5 and more preferably 0.2 to 3% by weight based on the weight of the oxidized polyolefin of sulfur.

The preferred composition of the present invention comprises asphalt, 1 to 25 and preferably 5 to 20% by weight based on the weight of the asphalt of oxidized polyethylene having a Brookfield viscosity at 149° C. of from 100 to 40,000 centipoises. The composition contains from 0.1 to 10, preferably 0.1 to 5 and most preferably 0.2 to 3% by weight based on the weight of the asphalt of sulfur. The asphalt is preferably oxidized asphalt. The composition can contain from 0 to 40, and preferably from 5 to 20% based on the weight of the asphalt of an initial viscosity modifier such as paraffin wax. The composition can contain from 0 to 150 and preferably 1 to 125% by weight based on the weight of the asphalt of a filler. Preferred fillers include calcium carbonate, talc, and silica.

The present invention also includes an article comprising a substrate and a coating on the substrate wherein the coating comprises an oxidized polyolefin and from 0.1 to 10, preferably 0.1 to 5 and more preferably, 0.2 to 3% by weight based on the weight of the oxidized polyolefin of sulfur. A preferred article comprises a substrate coated with the asphalt and oxidized polyolefin composition described above. The substrate is preferably a sheet selected from the group consisting of felt, paper, glass mat, and cardboard.

DESCRIPTION OF THE PREFERRED EMBODIMENTS

The present invention includes sulfur stabilized oxidized polyolefin and asphalt compositions. The present invention also includes articles comprising substrates coated with these compositions.

One embodiment of the present invention is a composition comprising an oxidized polyolefin from 0.1 to 10, preferably 0.1 to 5, and most preferably 0.2 to 3% by weight based on the weight of the oxidized polyolefin of sulfur. The amount of sulfur is based on the amount of elemental sulfur where a sulfur containing compound or composition is used. The oxidized polyolefin is preferably selected from oxidized polyethylene and oxidized polypropylene with oxidized polyethylene being most preferred. Oxidized polyethylene useful in the present invention has a Brookfield viscosity at a 149° C. and from 100 to 40,000 centipoises.

An alternate and preferred embodiment of the composition of the present invention comprises asphalt, 1 to 25%, and preferably 5 to 20% by weight based on the weight of the asphalt of oxidized polyethylene having a Brookfield viscosity at 149° C. and from 100 to 40,000 centipoises, 0.1 to 10, preferably 0.1 to 5, and more preferably 0.2 to 3% by weight based on the weight of the asphalt of sulfur.

The composition of the present invention can contain from 0 to 40, preferably 5 to 20 and more preferably 5 to 15% by weight based on the weight of the asphalt of an initial viscosity modifier such as paraffin, paraffin oils, or a saturant. The composition contains from 0 to 150, preferably 1 to 125, and most preferably from 50 to 125% by weight based on the weight of the asphalt of a filler.

The oxidized polyethylene useful in the composition of the present invention can be prepared by the method disclosed in U.S. Pat. Nos. 3,434,993; 3,322,711; and 3,153,025. Oxidized polyethylene which can be used in the formulations of the present invention has a softening point of 100° to 150° C. as measured by ASTM (E-28); a penetration hardness of about 10.0 dmm to about 0.1 dmm, preferably 9.0 dmm to 0.5 dmm or less as measured by ASTM (D-5); a density of 0.90 to 1.00 grams per cubic centimeter as measured on the ASTM (D-1505); a Brookfield viscosity at 149° C. of 100 to about 40,000 cps; an acid number of about 10 to 35, preferably 15 to 50, milligrams of KOH necessary to neutralize one gram of sample; and a number average molecular weight of 1,000 to about 10,000, preferably 1,500 to 6,000. Typical oxidized polyethylene polymers which can satisfactorily be used are summarized in Table 1:

TABLE 1

| Sample | Softening Point °C. (ASTM E-28) | Softening Point °F. | Hardness dmm (ASTM D-5) | Viscosity-cps 149° C. (300° F.) (Brookfield) | Acid No. mg KOH/g |
|---|---|---|---|---|---|
| A | 104 | 219 | 5.5 | 157.5 | — |
| B | 107 | 225 | 2.5 | 132.5 | 16 |
| C | 100 | 212 | 9.0 | 122.5 | 15 |
| D | 110 | 230 | 1.5 | 190.0 | — |
| E | 111 | 232 | 1.2 | 190.0 | — |
| F | — | — | <0.5 | 2,500 | 41 |
| G | 138 | 280 | <0.5 | 9,000 | 20 |
| H | 140 | 284 | <0.5 | 30,000 | 11 |
| I | — | — | <10 | 130,000 | 7 |
| J | — | — | <10.5 | 25,000 | 20 |

A preferred oxidized polyethylene is Sample F having a hardness of less than 0.5 dmm; a density of 1.00 grams per cubic centimeter; a Brookfield viscosity at 150° C. of about 2500 centipoises (cps) and an acid number of 41 with a molecular weight between 3,000 and 5,000.

For the purposes of the present invention, asphalt as used is defined in U.S. Pat. Nos. 3,328,147 and 4,382,989 both hereby incorporated by reference. Generally, asphalt is a dark brown to black cementitious material, solid or semisolid in consistency, in which the predominating constituents are bitumens which occur in nature as such or obtained as a residue in refining petroleum. Typically, it is described as a black solid, with a dull luster. It can be streaked with black to brown. Its solubility in carbon bisulfite can vary from 69 to 99%. Typically, the flash point is from 350° F. to 450° F. The asphalt used in the compositions of the present inventon is preferably refined asphalt.

The asphalt is preferably oxidized to give it better weather resistance and stability. The oxidation can be conducted by mixing the asphalt with air and heating to between 350° F. and 500° F. with or without a catalyst. When no catalyst is used, it takes between 4 to 6 hours to oxidized the asphalt. With a catalyst, the processing time is shortened to between 2 and 4 hours. A preferred catalyst is ferric chloride ($FeCl_3$).

For the purposes of the present invention the term sulfur includes elemental sulfur in any of its forms. The term sulfur can also include compositions and compounds containing sulfur which release the sulfur without other portions of the sulfur composition or compound interfering detrimentally with the composition. A compound is a material where the sulfur is chemically combined and a composition is where the sulfur is in a mixture or blend. An example of such a compound is dipentamethylene thiuramhexasulfide. Although sulfur is generally considered a cross-linking agent, it is known to lower the viscosity of spent asphaltic concrete as disclosed in U.S. Pat. No. 4,239,547. It has been found that the addition of sulfur to oxidized polyethylene does not result in an increase in the viscosity but reduces the viscosity slightly. It has also been found that the sulfur reduces the viscosity of oxidized polyethylene and asphalt compositions.

The viscosity of the asphalt, particularly oxidized asphalt, and oxidized polyolefins, particularly oxidized polyethylene increase with temperature, shear, and time. The addition of the sulfur results in decreasing the viscosity of a composition of oxidized polyethylene and oxidized asphalt and maintaining or slightly decreasing the viscosity of the oxidized polyethylene. The maintenance of a low viscosity is important to enable the composition to be used in various processes. For example, by having a low viscosity the composition of the present invention can be more easily coated onto a substrate such as a roll of paper than if the viscosity was higher.

The composition of the present invention can contain from 0 to 150, preferably 1 to 25, and more preferably 50 to 125% by weight based on the weight of the asphalt of a filler.

Any suitable filler can be used. The fillers may optionally be treated with various coupling agents or adhesion promoters as is known to those skilled in the art. Such fillers may be selected from a wide variety of minerals, metals, metal oxides, siliceous materials, metal salts, and mixtures thereof. Examples of fillers include alumina, aluminum hydrates, feldspar, asbestos, talc, calcium carbonates, clay, carbon black, quartz, novaculite and other forms of silica, kaolinite, bentonite, garnet, mica, saponite, bentonite, etc. The foregoing recited fillers are illustrative only and are not meant to limit the scope of the fillers that can be utilized in this invention. There is up to 150 percent by weight of the asphalt of filler, and preferably 30 percent to 90 percent by weight of the asphalt of filler.

The composition can contain from 0 to 40 and preferably 5 to 20% by weight based on the weight of the asphalt of an initial viscosity modifier. Such viscosity modifiers include paraffin wax, paraffin oils, and saturant. Saturant is unoxidized asphalt added to an oxidized asphalt to control the viscosity.

The present invention includes articles having a substrate and a coating on the substrate. The coating can comprise a stabilized oxidized polyolefin composition as described above or a stabilized oxidized polyolefin, preferably polyethylene, and asphalt composition as described above. The preferred substrates are sheetlike material including felt, paper, cardboard, and fibrous mat such a glass mat.

The compositions of the present invention can be formed by melt blending sulfur into molten oxidized polyolefin or a composition of molten oxidized polyolefin and oxidized asphalt. The molten mixture is stirred until the blend is uniform.

Several examples are set forth below to illustrate the nature of the invention and the manner of carrying it out. However, the invention should not be considered as being limited to the details thereof.

EXAMPLE 1

Compositions of the present invention were made using oxidized polyethylene (OPE) having a softening point as measured on ASTM D-3109-77 of 137° C. (279° F.), a hardness measured according to ASTM D-5 of 0.5 dmm, a density of 1.00 grams per cubic centimeter as masured in ASTM D-1505, a Brookfield viscosity at 150° C. of 1900 centipoises, and an acid number of 41 milligrams of KOH/grams.

The oxidized polyethylene was melt blended with powdered sulfur at 149° C. (300° F.) with continual stirring. The stirring was conducted with a motorized high speed stirrer in steel pint cans. The blend was stirred for ½ hour at 149° C., placed in an oven at 149° C. for 16 hours without stirring, removed from the oven and allowed to stand at room temperature 25° C. for 8 hours and then placed in an oven at 149° C. for 16 hours. Composition in weight percent and Brookfield viscosity in centipoises is summarized in Table 2 below:

TABLE 2

|  | Ex. 1 | Comp. 1 |
| --- | --- | --- |
| OPE | 98 | 100 |
| Sulfur | 2 | — |
| (cps) @ |  |  |
| 0 hrs, 149° C. | 1900 | 1900 |
| ½ hr, 149° C. | 2025 | 2300 |
| 16 hrs, 149° C. | 6200 | 6900 |
| 8 hrs, 25° C. | — | — |
| 16 hrs, 149° C. | 7000 | 7800 |
| Comment | uniform | skin |

The oxidized polyethylene upon being subjected to heat and stirring resulting in an increase in viscosity. In Comparative 1 containing 100% oxidized polyethylene, a second phase skin developed. The skin that developed was not compatible with the rest of the composition. In Example 1, 2% sulfur resulted in an uniform although darker mixture with no skin forming. The Example 1 composition had a lower viscosity upon being heated and sheared.

EXAMPLE 2

The composition of Example contained the same type of oxidized polyethylene and powdered sulfur as used in Example 1. The composition contained oxidized asphalt. The asphalt had a Mettler drop point or softening point of 93.6° C., a hardness at 77° F. (25° C.) of 6.2 dmm according to ASTM D-5, and a Brookfield viscosity at 149° C. of 1150 centipoise. The filler used was powdered calcium carbonate having an average particle size of less than 10 micrometers. The viscosity modifier was paraffin having a paraffin softening point of 140° F.

The compositions were melt blended. All of the components of the composition except filler were first melted. The viscosity was measured and then the filler was added with continual stirring. The stirring was conducted with a motorized laboratory high speed stirrer in steel pint cans. The mixture was stirred and maintained at 149° C. The mixture was then placed in an oven at 149° C. and Brookfield viscosity at 149° C. periodically measured. After 2 hours of shear the mixture was put in an oven at 149° C. for 16 hours. This was followed by 1 hour of shearing at 149° C. The compositions in weight percent and Brookfield viscosities at 149° C. measured are summarized in Table 3.

TABLE 3

|  | Ex. 2 | Comp. 2 |
| --- | --- | --- |
| OPE | 5 | 5 |
| Asphalt | 38 | 40 |
| Sulfur | 2 | — |
| CaCO$_3$ | 45 | 45 |
| Paraffin | 10 | 10 |
| Viscosity (cps) @ (unfilled) 0 hrs | 175 | 210 |
| Viscosity (cps) @ (filled) 0 hrs | 1150 | 1575 |
| 1 hr | 1200 | 1990 |
| 1 hr | 1250 | 2775 |
| 16 hrs | 1375 | 3450 |
| 1 hr | 1300 | 6500 |

Example 2 indicates that the addition of the sulfur results in a stabilized composition where the viscosity is maintained at a lower value than the Comparative 2 composition where the viscosity increases.

EXAMPLES 3–5

In Examples 3–5 compositions were prepared using the materials described in Examples 1–2. The mixing, heating and stirring conditions of Example 2 were used. The purpose was to study the affects of varying the amount of sulfur. Compositions in weight percent and Brookfield viscosities measured at 149° C. are summarized in Table 4 below:

TABLE 4

|  | Ex. 3 | Ex. 4 | Ex. 5 | Comp. 3 |
| --- | --- | --- | --- | --- |
| OPE | 5 | 5 | 5 | 5 |
| Asphalt | 38 | 39.5 | 39.75 | 40 |
| Sulfur | 2 | .5 | .25 | — |
| CaCO$_3$ | 45 | 45 | 45 | 45 |
| Paraffin | 10 | 10 | 10 | 10 |
| Viscosity (cps) @ (unfilled) 0 hrs | 175 | 170 | 185 | 210 |
| Viscosity (cps) @ (filled) |  |  |  |  |
| 0 hrs | 1150 | 1350 | 1300 | 1575 |
| 1 hr | 1200 | 1450 | 1575 | 1990 |
| 1 hr | 1250 | 1625 | 1875 | 2775 |
| 16 hrs | 1375 | 1425 | 1875 | 3450 |
| 1 hr | 1300 | 1500 | 2125 | 6500 |

The results are consistent with Example 2. With as little as 0.25 weight percent sulfur the viscosity increase of the composition is significantly reduced.

While exemplary embodiments of the invention have been described, the true scope of the invention is to be determined from the following claims:

What is claimed is:

1. An article comprising
   a substrate;
   a coating on the substrate wherein the coating comprises asphalt, 1 to 25 weight percent based on the weight of the asphalt of an oxidized polyethylene having a Brookfield viscosity at 149° C. of from 100 to 40,000 centipoises, from 0.1 to 10 percent by weight based on the weight of the asphalt of sulfur, 0 to 40 percent by weight based on the weight of the asphalt of an initial viscosity modifier, and 0 to 150 percent by weight based on the weight of the asphalt of a filler.

2. The article as recited in claim 1 wherein the asphalt is oxidized asphalt.

3. The article as recited in claim 1 wherein there is from 5 to 20 percent by weight based on the asphalt of oxidized polyethylene and 0.1 to 5 percent by weight based on the weight of the asphalt of sulfur.

4. The article as recited in claim 3 wherein there is from 1 to 125 percent by weight based on the weight of the asphalt of filler.

5. The article as recited in claim 1 wherein the filler is selected from the class consisting of calcium carbonate, talc, and silica.

6. The article as recited in claim 1 wherein the substrate is a sheet made of a material selected from the group consisting of felt, paper, glass mat, and cardboard.

* * * * *